Oct. 17, 1967  D. M. NASH, JR  3,347,336
SEISMIC WAVE GENERATOR
Filed June 29, 1965

INVENTOR:
D. M. NASH, JR.
BY: *N. M. Kunitz*
HIS ATTORNEY

# United States Patent Office 3,347,336
Patented Oct. 17, 1967

3,347,336
SEISMIC WAVE GENERATOR
David M. Nash, Jr., El Paso, Tex., assignor to Shell Oil Company, New York, N.Y., a corporation of Delaware
Filed June 29, 1965, Ser. No. 467,926
2 Claims. (Cl. 181—.5)

ABSTRACT OF THE DISCLOSURE

A seismic wave generator of the type wherein a spark discharge is created in a fluid-filled, dome-shaped housing. The open end of the housing is closed by a flexible diaphragm and a rigid plate is loosely mounted across the open end adjacent the diaphragm to protect it. The rigid plate is loosely mounted to transmit substantially no stresses to the housing due to pressure pulses created within the housing.

---

Figure 1:
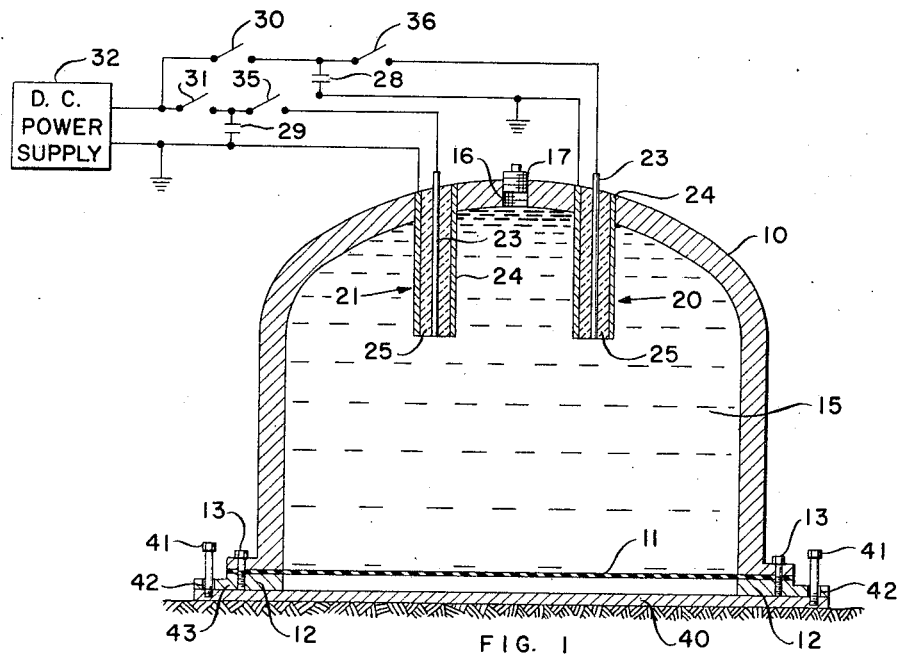

This invention relates to the art of geophysical exploration and, more particularly, pertains to an improved apparatus for generating artificial seismic waves such as are employed in seismic prospecting methods for locating underground oil reservoirs.

In the art of seismic prospecting, strata near the earth's surface are investigated by correlating and studying records of artificially produced elastic or seismic waves. According to this method, artificial disturbances are imparted to the earth's surface which tend to set the earth in motion, and the motion is detected and recorded at one or more selected points or seismometer stations located at known distances from the shock-imparting or shot point.

The most generally accepted method of creating an artificial disturbance in the earth's surface is by means of explosives such as dynamite. These disturbances are normally produced by drilling a shot hole into the earth's surface below the so-called weathered layer, positioning a charge of dynamite at the bottom of the shot hole, and then exploding the dynamite. While this method has the advantage of producing a relatively steep seismic or pressure wave front in the earth whose instant of generation is accurately known, the method, in addition to being inherently dangerous, is both expensive and time consuming. Additionally, the use of explosives for creating seismic or artificial disturbances in the earth has the further disadvantage that the resultant explosion damages the land, for example, by forming a cavity therein, making it impossible to impart two or more shocks or impacts to the earth at the same point under identical conditions, and requiring the filling in of the cavity to avoid possible accidents to people and livestock.

In order to overcome some of the deficiencies and problems of creating artificial seismic disturbances by means of an explosive, another well-known method of creating seismic impacts has been developed which entails the dropping of a heavy weight onto the ground. Normally, the weight is carried on the back of a truck so that it can easily be moved from one location to another and is automatically dropped in response to a signal from the recording mechanism. While this method overcomes the objections to the explosive method, namely, damage to the earth, and time needed to set the charges, it inherently has a number of deficiencies which make it difficult to accurately process seismic records. For example, due to the unevenness of the terrain being explored, it is not always possible to drop the weight from the same height each time a shock is to be recorded, thereby imparting different quantities of energy to the earth. Additionally, because of the inherent nature of the mechanism used to drop the weight, often variable and unknown time delays are inserted into the system. Because of these two factors, the time intervals between the signal releasing the weight and the time the weight actually contacts the ground and imparts a seismic wave thereto is not always the same and hence the time of the generation of the seismic impact is not accurately known. This presents a problem when trying to composit or correlate a number of seismic recordings from different impacts or drops and often necessitates the shifting of the different seismogram recordings relative to each other during the study of the results to produce correlation between common traces on the recordings.

In order to overcome the problems inherent in both the explosive and weight dropping methods of artificially creating seismic disturbances, it has been proposed to create the seismic impacts by means of shock wave energy created in a liquid by an electrical spark discharge. Such a system is shown, for example, in the copending United States application of J. W. Miller, Ser. No. 273,967, filed Apr. 18, 1963, now Patent No. 3,268,028, entitled "Method and Apparatuses for Seismic Exploration," and in applicant's copending application Ser. No. 467,925, filed June 29, 1965, entitled "Method and Apparatus for Seismic Exploration." Generally, according to these disclosures, a spark is created in a liquid-filled dome having a relatively thin flexible diaphragm across its open end and in contact with the earth, by discharging a capacitor across a spark gap immersed in the liquid. The spark discharge creates a plasma bubble in the liquid which expands, thereby forming a compressional wave in the liquid which strikes the diaphragm and thereby transmits the energy in the plasma to the earth as a seismic disturbance. Seismic waves created in this manner are of short duration but with a steep wave front and of high intensity, and, moreover, the instant of firing may be accurately controlled.

As in the weight dropping method, the spark discharge type of seismic wave transducer is normally carried on the back of a truck in a manner whereby it may be rapidly lowered to the ground for creation of a seismic disturbance and then raised again for transport to the next shot point or impulse location. The raising and lowering of the transducer between sequential impulses is usually very rapid, both for reasons of economy and since good prospecting technique often requires that the time between impulses at adjacent impulse locations be relatively short, for example, in the order of 6 to 10 seconds, and accordingly it is impossible to preexamine the ground where the transducer is to be lowered in order to insure that there are no sharp or protruding objects on the ground. This presents a practical problem in the use of this type of compressional wave transducer since the relatively thin diaphragm, which is usually constructed of a material such as neoprene, and which transmits the energy in the plasma bubble to the ground, may easily be ruptured by such sharp objects. Since rupture of the diaphragm would allow the liquid to escape from the dome and render the entire transducer inoperative, the protection of the diaphragm against such rupture presents a major problem in the use of this type of compressional wave transducer.

One obvious expedient for protecting the diaphragm would be to secure a plate of metal or some other rigid material to the dome shaped housing across the open end thereof and adjacent to the outer surface of the diaphragm. However, the mounting of such a plate presents numerous problems in view of the extremely large quantities of energy which must be generated in the dome and transmitted to the earth in order to create a seismic disturbance of sufficient magnitude from which useful information can be derived. For example, the electrical energy discharged into the liquid for any one impulse to be transmitted to the earth may be in the order of 15–60 kilojoules. While this quantity of energy could be transmitted to the earth via the rigidly secured plate, stresses of great magnitude would be generated in the rigid portions of the seismic transducer tending to rupture the transducer housing at its weakest point, thereby obviating the advantage gained through the use of the plate, i.e., the protection of the diaphragm against rupture. Moreover, the use of a rigidly mounted plate across the open end of the dome has the disadvantage that the efficiency of the transducer, i.e., the ratio of the energy actually transmitted to the ground to the initial electrical energy used to create the spark discharge or discharges, is decreased due to the quantity of the energy needed to flex the protective plate.

It has been found that the protection of the diaphragm may be achieved and the problems mentioned above inherent in using a fixedly mounted plate may be eliminated by mounting a rigid plate across the open end of the dome and adjacent the outer surface of the diaphragm in such a manner that it is free to move for a limited distance in a direction along the vertical axis of the dome, i.e., in the direction of the pressure pulse transmitted to the ground. The plate mounted in this manner does not decrease the efficiency of the transducer since no energy is required to flex the plate but rather the plate itself is caused to move with the generated pressure pulse and consequently aids in transmitting and coupling the compressional wave energy to the ground. Moreover, since the plate moves relative to the dome, by means of a loose coupling arrangement, no stresses are transmitted to the dome from the plate which would tend to cause rupture or failure of the transducer.

Briefly, then, applicant's invention comprises an improvement for a seismic wave generator for producing compressional wave energy by means of a spark discharge in a liquid, which makes the use of such a generator practical for seismic exploration purposes over relatively long periods of time. This improvement comprises, in combination with a seismic wave generator of the type including a heavy dome shaped housing adapted to be positioned with its open end juxtaposed to the surface of the earth, a flexible diaphragm closing the open end of the dome in a fluid-tight manner, a dielectric fluid substantially filling said dome-shaped housing, a spark gap electrode extending into said fluid, and a source of high voltage connected to the spark gap capable of creating a discharge across the gap sufficient to create a pressure wave in the fluid; a rigid plate loosely coupled to the dome across the open end thereof and adjacent to the outer surface of the diaphragm in a manner so that substantially no stresses are transmitted to the housing due to the pressure waves created therein and striking the rigid plate. Such a result may be achieved by mounting the plate so that it is free to move for a limited distance, for example, 2 to 4 inches, in a direction along the vertical axis of the dome-shaped housing i.e., in the direction of the pressure wave transmitted to the ground.

Figure 2:
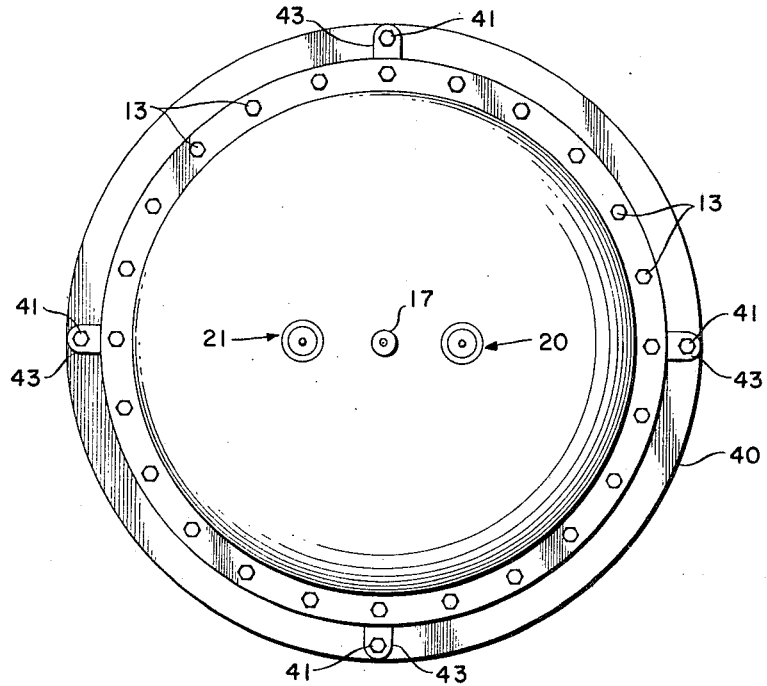

The invention and the advantages thereof will be more clearly understood from the following description taken in conjunction with the accompanying drawings wherein:

FIGURE 1 is a sectional elevation of the preferred embodiment of the seismic wave generating transducer according to the invention including a schematic showing of the electrical circuitry necessary to create the pressure wave therein; and FIGURE 2 is plan view of the transducer shown in FIGURE 1.

Referring now to FIGURE 1, there is shown a dome-shaped housing 10 which is positioned with its open end juxtaposed the ground. The dome 10 may have any desired shape such as hemispherical, semi-elliptical, parabolic, etc., which tends to reflect any compressional or pressure waves generated in the dome in substantially a single direction, i.e., toward the open end. The dome itself is preferably constructed of a metal such as steel with wall thicknesses sufficient to withstand the high energy stresses imparted thereto by the large energy pressure pulses generated therein and of sufficient weight, e.g., 1–3 tons, to impart to the dome a large inertia factor tending to aid in preventing the dome from leaving the ground because of the pressure generated therein. For example, a dome approximately three feet in diameter and two feet in height constructed of 2-inch steel weighing approximately 2½ tons may be used. As shown in my above-mentioned copending application, the disclosure of which is incorporated herein, the dome 10 is normally carried on the back of a truck (not shown) in such a manner that it may be raised and lowered relative to the ground and the weight of the truck body imposed thereon.

The open end of a dome 10 is sealed by means of a relatively thin flexible diaphragm 11, which may, for example, be constructed of neoprene or any other suitable material, to form a closed chamber within the housing or dome 10. The diaphragm 11 is sealed to and maintained positioned against the housing 10 by any convenient clamping means, as, for example, the ring 12 and the plurality of bolts 13.

The chamber formed by the housing 10 and the diaphragm 11 is substantially filled with a relatively non-compressible dieelectric fluid 15, preferably water or an aqueous solution, which is supplied to the chamber via an opening 16 in the top of the housing 10. During use of the seismic wave generator, this opening is normally sealed by any convenient means such as the threaded plug 17.

In order to create a spark discharge within the liquid 15, the housing 10 is provided with one or more spark discharge electrodes 20 and 21 each of which generally consists of a pair of spaced conductors defining a spark gap therebetween. While any form of spark discharge electrode may be used, for example, conventional spark plugs, preferably the spark discharge electrodes 20, 21 each consist of a conductive rod 23 axially mounted within a conductive cylinder 24 and separated from and bonded thereto by means of a ceramic or plastic dielectric material 25. With this configuration, the rod 23 and the cylinder 24 constitute the two conductors defining a spark gap therebetween. The spark discharge electrodes 20 and 21 are mounted in the dome 10 in any convenient manner. Of course, since the housing 10 is preferably constructed of metal, care must be taken that only one of the two conductors 23 or 24 is in electrical contact with the dome 10.

Each of the spark discharge electrodes 20, 21 is connected to an individual source of relatively high DC potential which consist essentially of a charged storage capacitor 28 and 29, respectively. The capacitors 28 and 29 are connected in parallel via respective switches 30 and 31 to the output of a high voltage DC power supply 32 which, for example, has a maximum output voltage of approximately 20 kilovolts. Preferably, the power supply 32 is variable so that the voltage applied to the storage capacitors 28 and 29 and hence the charge thereon may be varied in order to control the magnitude or intensity of the pressure pulses created in the liquid 15. Connected between each of the capacitors 28 and 29 and their respective spark discharge electrodes 20 and 21 is a switch 35 or 36 in order to allow discharge of the capacitors via the spark discharge electrodes at selected times. It should be understood that while the switches 30, 31, 35, and 36 have been shown as simple mechanical switches, that in a practical operative embodiment electronic switching devices are preferably used. For example, the switches 35 and 36 each preferably consists of a grid controlled rectifier, such as an ignitron (General Electric GL-7703). Such electronic switching circuits, however, are conventional and well known in the art, and per se form no part of this invention.

In order to create a spark discharge in the liquid 15, one or more of the capacitors 28 and 29 are charged by closing the respective switches 30 and 31 after which the closed switches are opened in order to disconnect the charged capacitor from the power supply 32 as a precautionary measure to prevent any of the stored energy from returning to the power supply 32. The discharge of the respective capacitors 28 and 29 is then achieved by closing the respective switch 35 or 36 which connects the respective storage capacitor, for example, capacitor 28, across its respectively connected spark discharge electrode 20, thereby producing a spark across the spark gap between the conductors 23 and 24 of the electrode and resulting in the generation of a high energy plasma bubble in the liquid 15. The expanding plasma bubble in the liquid 15 causes an effective pressure pulse to be generated in the liquid which strikes the diaphragm 11 and is transmitted thereby to the ground adjacent the diaphragm.

In order to protect the diaphragm against rupture by sharp objects on the ground beneath the diaphragm both when the dome is initially dropped on the ground and during flexure of the diaphragm 11 due to a pressure pulse generated in the liquid 15, the housing 10 is provided with a rigid plate 40 which covers the open end of the dome 10 adjacent the outer surface of the diaphragm 11. When so mounted the plate 40 is the only part of the seismic wave generator which is actually in contact with the ground. The plate 40 is preferably constructed of a sheet of a material such as steel which can withstand the punishment imparted thereto by the continuous contact with the rocks and other materials found in the ground beneath the seismic wave generator. The thickness of the plate 40 is not critical; however, it should not be greater than is necessary to provide the plate with the required degress of strength so as not to add unnecessary weight to the seismic wave generating assembly. However, it has been found that the area of the plate 40 should be at least the same or, as shown in the drawing, slightly larger than that of the diaphragm 11 in order that the efficiency of the seismic wave generator, i.e., the ability of the seismic wave generator to couple the energy created in the liquid to the ground, not be diminished. Preferably, as shown in the drawings, the plate 40 is at least equal to the outer diameter of the housing 10 in order to eliminate the possibility of rupturing the diaphragm by catching it between the edge of the plate 40 and inner surface of the dome 10 and also to avoid the possibility of the diaphragm being driven against an edge of the plate 40 as would occur if the diameter of the plate were smaller than that of the diaphragm 11.

To avoid decreasing the quantity of energy coupled to the ground by the amount of energy necessary to flex the plate 40, and also to avoid creating stresses in the housing 10 due to the pressure pulses striking the plate 40, a mounting is provided for the plate which enables it to move for a limited distance in a direction along the vertical axis of the dome or, in other words, in the direction of the pressure pulse which is transmitted to the ground. Although any type of mounting which will produce this result may be utilized, preferably, as shown in the figure, the plate 40 is loosely mounted on the dome shaped housing 10 by means of a plurality, i.e., four elongated studs 41 which extend upwardly through a corresponding plurality of openings or bushings 42 contained in laterally extending flanges 43, and are free to move along the axis of the openings 42. The studs 41 and the openings 42 are preferably symetrically distributed about the periphery of the plate 40 in order to maintain it in proper orientation across the open end of the dome 10. Although the flanges 43 are shown as constituting a portion of the ring 12, it is to be understood that these flanges may be secured to the housing 10 at any desired height. The studs 41 are of sufficient length so that the distance which the studs extend above the flanges 43 when the dome 10 is initially placed in contact with the ground is sufficient to allow the plate 40 to move relative to the dome 10 a distance sufficient to dissipate the energy in the pulse generated in the liquid 15 without imparting any stresses to the dome 10. For example, it has been found that a distance between flanges 43 and the heads of the studs 41 of approximately two inches is sufficient for this purpose.

It should be noted that when the spark discharge is created in the fluid 15, the resulting pressure pulse primarily travels downward through the liquid thereby flexing the diaphragm 11 and driving it, together with plate 40 into the ground to create the desired compressional or seismic wave. With the plate 40 mounted as shown in the drawing, the movement of the plate does not transmit any stresses to the dome 10 since the entire plate moves relative to the dome 10 along the axis of the studs 41, i.e., the vertical axis of the dome 10. On the other hand, it is obvious that if the plate 40 were rigidly mounted to the dome 10, as for example by bolts, large bending stresses would be created.

It should also be noted that another important feature of the mounting of the plate according to the invention, is the dissipation of the remaining energy in the dome after the creation of the seismic impact. Once the diaphragm 11 and the plate 40 have been driven into the ground a distance such that the earth beneath the transducer has reached its elastic limit, and thereby created a seismic impact, no further energy can be dissipated in a downward direction. Accordingly, the remaining energy in the dome must be dissipated in some other direction. With the plate 40 mounted as shown, this energy, which is acting in all directions against the inner surface of the dome 10 and the diaphragm 11, is dissipated in lifting the dome slightly off of the ground. Again because the plate 40 is mounted so that relative movement can exist between the plate 40 and the dome 10, no stresses are generated in the transducer due to this lifting movement.

Obviously, various modifications of the invention are possible in light of the disclosure without departing from the spirit and scope of the invention. For example, although four studs 41 are shown for mounting the plate 40 on the dome 10, any number which will maintain the plate in its proper orientation may be used. It is therefore to be understood that within the scope of the appended claims, the invention may be practiced other than as specifically illustrated.

I claim as my invention:

1. In combination with a seismic wave generator of the type including: a heavy, thick-walled dome adapted to be positioned with its open end juxtaposed the surface of the ground, a flexible diaphragm closing the open end of said dome in a fluid-tight manner, a fluid in said dome above said diaphragm, a spark gap device extending into said fluid and a source of high voltage connected to said spark gap capable of creating a discharge across said gap sufficient to create a pressure pulse in said fluid, the improvement comprising: a rigid plate, said rigid plate being mounted across the open end of said dome adjacent the outer surface of said diaphragm, said rigid plate being mounted on said dome by means of a plurality of elongated studs distributed about the periphery of said plate and fixedly secured to said plate, each of said studs extending upwardly through a respective opening in a laterally extending flange on said dome, said studs being free to move along the axis of said openings whereby said rigid plate is free to move in a direction along the vertical axis of said dome.

2. The apparatus of claim 1 wherein said plurality of studs are symmetrically distributed about the periphery of said plate.

References Cited

UNITED STATES PATENTS

| 3,235,027 | 2/1966 | Kilmer | 181—.5 |
| 3,268,028 | 8/1966 | Miller | 181—.5 |
| 3,270,832 | 9/1966 | Williams | 181—.5 |

FOREIGN PATENTS 608,169  11/1960  Canada.

BENJAMIN A. BORCHELT, *Primary Examiner.*

G. H. GLANZMAN, *Assistant Examiner.*